Oct. 7, 1930.                H. A. SELAH                1,777,504
                          CONDUIT PULL BOX
                        Filed Nov. 30, 1925
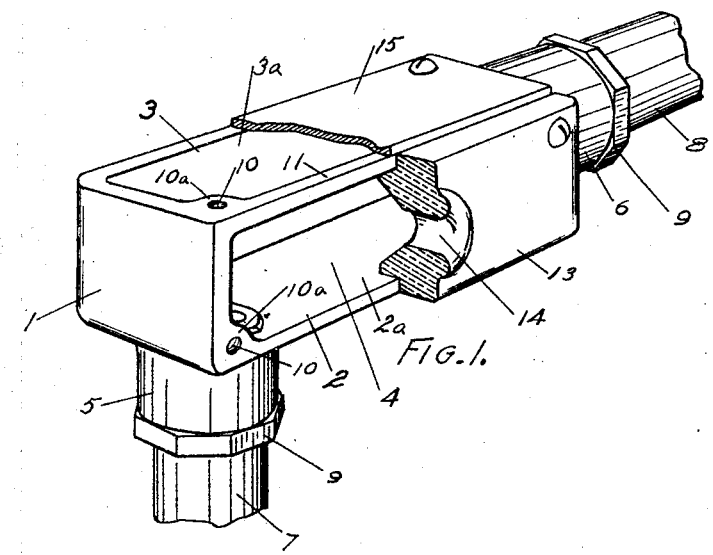
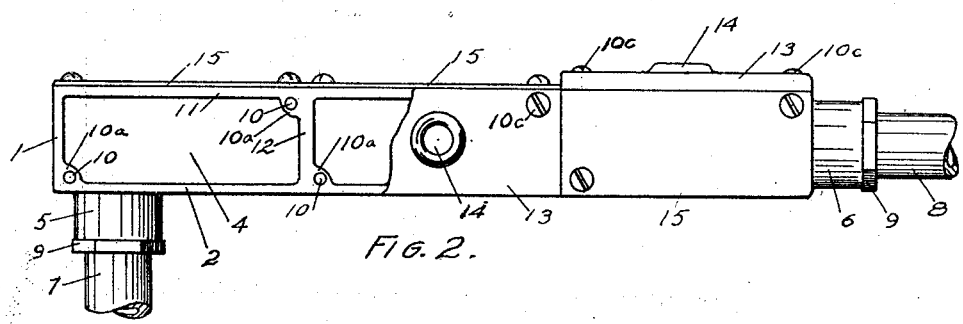
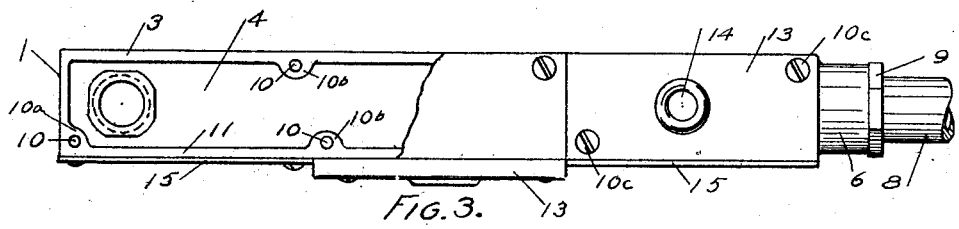
INVENTOR.
Howard A. Selah
BY
ATTORNEYS.

Patented Oct. 7, 1930

1,777,504

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT PULL BOX

Application filed November 30, 1925. Serial No. 72,182.

This invention is designed to improve conduit pull boxes. With such boxes, especially those carrying in a number of wires it is often difficult to properly lead the wires from the box in a convenient manner and difficult to arrange them in the box. With the present invention I leave the adjacent sides of the box open. This permits of putting the cover plates having the lead openings in place and still having access to the box in arranging the wires in the box so as to properly run through to the openings.

Where large numbers of wires are used elongated boxes are used and it has been the practice to provide such boxes with single elongated covers. This has made it necessary, in most instances, to form a special cover for each installation. In the present invention covers are made in interchangeable sections. In this way the covers with the lead openings can be arranged at the ends, or center as desired and the interchangeable sections can be formed in standard units having a greater, or less number of openings. In this way the operator can choose such cover units and arrange them on the box so as to give just the proper leads and thus with a few standard units a great number of combinations on the double cover is made possible. Here again the adjacent open sides are desirable and it is desirable to cover both the openings with the sectional plates so that if desired lead openings may be carried from both the sides and at such parts of the sides as may be desirable, thus giving great flexibility. Features and details of the invention will appear from the specification and claims.

The invention is illustrated in the accompanying drawings as follows:—

Fig. 1 shows a perspective view of a single section box, parts being in section to show construction:—

Fig. 2 a side elevation of an elongated box with plural cover sections:—

Fig. 3 a plan view of the structure shown in Fig. 2.

1 marks the box body. This has the closed sides 2 and 3 with a conduit chamber 4 and the open sides 2ª and 3ª. Conduit extensions have openings 5 and 6 in which conduits 7 and 8 extend. These are clamped by means of the nuts 9.

Screw-threaded openings 10 are arranged in the walls of the body usually in small projecting corner ears 10ª. A corner rib 11 forms a portion of the body and is arranged along the corner between the adjacent openings 2ª and 3ª. This rib is connected with one of the side walls by posts 12, thus forming corners in which ears 10ª may be provided for securing the cover plates. The posts are preferably coincident with the joints between the cover plate sections.

Cover plates 13 having lead openings 14 are secured to the body by means of screws 10ᶜ which extend through the covers into the screw-threaded openings 10. Ears 10ᵇ project from the sides of the rib 11 in the open top, or top free from the posts 12 for receiving the screws 10ᶜ. Blank plates 15 cover such sections of the openings as are not desired to be provided with lead openings 14. These plates may be ordinary metal cover plates.

It will be noted that the cover sections, as 13 and 15 are interchangeable and that cover sections 13 having the openings 14 may be placed where desired, either on both openings, or on different sections of the same opening as will make the lead openings most convenient in arranging the conductors. In this way a very simple yet very flexible structure is provided and one in which the operator may very readily arrange the wires, get them into the proper leads, and easily close the box.

What I claim as new is:—

1. In a conduit pull box, the combination of an elongated body having a conduit opening and a continuous opening extending throughout the side; and a plurality of interchangeable abutting cover sections covering the open side detachably secured on the outer face of the body, some of the sections having lead openings therethrough.

2. In a conduit pull box, the combination of an elongated body having a conduit opening and two adjacent open sides, the opening in one of the sides being continuous and extending throughout the length of the body; a corner rib between the open sides;

and covers for the open sides secured on the outer faces of the body and rib, there being a plurality of detachable sections on one of the open sides, some of said sections having lead openings therethrough.

3. In a conduit pull box, the combination of an elongated body having a conduit opening and two adjacent open sides, the opening in one of the sides being continuous and extending throughout the length of the body; a corner rib between the open sides; and covers for the open sides secured on the outer faces of the body and rib there being a plurality of detachable sections on each of the open sides, some of said sections having lead openings therethrough.

4. In a conduit pull box, the combination of an elongated body having a conduit opening and two adjacent open sides, the opening in one of the sides being continuous and extending throughout the length of the body; a corner rib between the open sides; a post connecting the rib with an opposing wall of the body; and covers for the open sides secured on the outer faces of the body and rib, there being a plurality of detachable sections on one of the open sides, some of said sections having lead openings therethrough.

5. In a conduit pull box, the combination of an elongated body having a conduit opening and two adjacent open sides, the opening in one of the sides being continuous and extending throughout the length of the body; a corner rib between the open sides; a post connecting the rib with an opposing wall of the body; covers for the open sides secured to the outer face of the body and rib there being a plurality of detachable sections on the open side having the posts; and joints between the sections registering with the posts, some of the sections having lead openings therethrough.

In testimony whereof I have hereunto set my hand.

HOWARD A. SELAH.